United States Patent [19]
O'Farrell et al.

[11] Patent Number: 5,999,987
[45] Date of Patent: *Dec. 7, 1999

[54] CONCURRENT PROCESSING IN OBJECT ORIENTED PARALLEL AND NEAR PARALLEL

[75] Inventors: William G. O'Farrell, Don Mills; Eshrat Arjomandi, Etobicoke, both of Canada

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/385,628

[22] Filed: Feb. 9, 1995

[30] Foreign Application Priority Data

Feb. 11, 1994 [CA] Canada .................................. 2115464

[51] Int. Cl.$^6$ ................. G06F 9/46; G06F 9/45

[52] U.S. Cl. .................. 709/304; 709/303; 709/305; 395/706

[58] Field of Search .................. 395/200.12, 200.03, 395/800.01, 706, 682–685; 709/300–305, 7, 8, 201; 712/1, 28, 29, 30, 235, 236; 710/7; 707/10, 103

[56] References Cited

U.S. PATENT DOCUMENTS

| | | | |
|---|---|---|---|
| 5,341,478 | 8/1994 | Travis, Jr. et al. | 709/203 |
| 5,377,350 | 12/1994 | Skinner | 709/303 |
| 5,499,343 | 3/1996 | Pettus | 709/203 |

FOREIGN PATENT DOCUMENTS

| | | | |
|---|---|---|---|
| 414 624 | 2/1991 | European Pat. Off. | G06F 9/46 |
| 3-103927 | 4/1991 | Japan . | |
| 4-160639 | 6/1992 | Japan . | |
| 5-20082 | 1/1993 | Japan . | |

OTHER PUBLICATIONS

Gunaseelan L. et al. "Distributed Eiffel: A Language for Programming Multi–Granular Distributed Objects on the Clouds Operating System" Proceedings of the International Conference on Computer Languages, Oakland, Apr. 20–23, 1992, No. Conf. 4, Apr. 20, 1992, pp. 331–340. IEEE p. 336, left–hand col., line 7–68.

"Making Synchronous Communication Look the Same as Normal Method" IBM Technical Disclosure Bulletin, vol. 37, No. 2B, Feb. 1, 1994, pp. 589/590.

"Asynchronous Software Communication Using Response Objects" IBM Technical Disclosure Bulletin, vol. 37, No. 2A, Feb. 1, 1994, pp. 617/618.

Walker E F et al. "Asynchronous Remote Operation Execution in Distributed Systems" Proceedings of the International Conference on Distributed Computing Systems, Paris, May 28–Jun. 1, 1990, Conf. 10, May 28, 1990, pp. 253–259 IEEE p. 253, left–hand col., line 49—right–hand col., line 20 p. 255, right–hand col., line 18— p. 256, right–hand col., line 30.

Published EPO Search report, Application No. 95300699.6–2201. Publication date: Jan. 15, 1999.

(List continued on next page.)

Primary Examiner—John A. Follansbee
Attorney, Agent, or Firm—Prenthiss W. Johnson

[57] ABSTRACT

In sequential object oriented languages such as C++, a mechanism is provided to permit multiple asynchronous processing operations without compiler modifications, language extensions or special pre-processing. A specially adapted pointer converts a procedure call into an asynchronous task thread, while returning an expected response to permit a calling program to continue processing. The returned value can be either discarded or converted to a future variable if the calling program requires the result of the separate processing on the asynchronous thread. The invention can be used in parallel multi-processors environments and in uni-processors having parallel processing characteristics.

4 Claims, 3 Drawing Sheets

OTHER PUBLICATIONS

IEEE p. 1003.4a/D4 Draft Standard, *Threads Extension for Portable Operating Systems,* Technical Committee on Operating Systems of the Institute of Electrical and Electronic Engineers (IEEE) Computer Society, New York, Aug. 10, 1990.

Chandra, R.; Gupta, A.; Hennessy, J., COOL: A Language for Parallel Programming, Languages and Compilers for Parallel Computing, MIT Press (1990), pp. 126–148.

Grunwald, D., *A Users Guide to AWESIME:* An Object Oriented Oriented Parallel Programming and Simulation System, University of Colorado at Boulder, Technical Report CU–CS–552–91 (Nov. 1991), pp. 1–23.

Doeppner Jr., T.W.; Gebele, A.J., *C++ on a Parallel Machine,* Brown University, Techinical Report CS–87–26 (Nov. 1987), pp. 1–12.

Gelernter et al., *Languages and Compilers for Parallel Computing,* MIT Press, pp. 126–148, 1990.

CONCURRENT PROCESSING IN OBJECT ORIENTED PARALLEL AND NEAR PARALLEL

BACKGROUND OF THE INVENTION

1. Field of the Invention

The present invention is directed to a mechanism for providing concurrent operations in order to maximize processor use, particularly in a compiled object oriented paradigm such as C++.

2. Description of the Related Art

In a simplistic model (such as an isolated workstation) a single program running on a single processor would perform each of its routines in a programmed order in sequence, dominating the processor until complete. A call to a subroutine (possibly a program module stored in a separate area of memory) would cause the processor to suspend or block operation on the main program while processing the subroutine. In this scenario, the processor resources are completely utilized (the processor is never left idle) and as there are no concurrent programs competing for the processor resources, the domination of the processor for the duration of processing the program and its routines is not a problem.

In a distributed system, multiple processors each with associated memory are available, and a call to a subroutine outside the program could easily be a call to a program module residing on a different processor on the system. It is the remote processor then that would perform the operations for the subroutine to return the desired results to the main program.

Linked multiple processors or distributed systems are becoming increasingly popular with the advent of the distributed computing environment (DCE) of the Open System Foundation (OSF), an emerging technology enabling distributed computing among heterogenous systems.

In the normal local procedure call, there is a unique interface between the calling program and a specific subroutine, and the local procedure call invokes all necessary logic for operability. When the subroutine resides on a different machine than the calling program, as in a distributed system, communications logic (i.e. the location of the subroutine, data conversions, etc.) is required for the call and traditionally must be hard coded into the calling and/or called programs. This would be especially complex where the remote processor is not homogeneous or compatible with the calling function.

By contrast, DCE, when implemented on each of the disparate systems, allows transparent inter-operation between computers on the network through a mechanism called the "remote procedure call" (RPC) that extends to the distributed environment, and particularly the heterogeneous environment, the concept of the local procedure call.

As a result, remote calls are handled transparently to the programmer as well as the user, as the programmer is no longer required to code support for each remote call.

However, in any distributed environment, unless provisions are made during program planning, the main program continues to occupy its processor even while suspended or blocked and awaiting return of its remote call. During the period of this suspension, the processor is idle.

The time that the waiting program is suspended might, in real terms, amount to only fractions of a second if the remote processor can operate on the subroutine immediately. However, in complex distributed systems, queuing at the remote processor can introduce considerable time delays, and all the while the waiting processor continues to be idle.

The ideal situation would be to have concurrent operations on each processor, that is, every active object would have a separate thread so that while one thread was "waiting" or suspended, other threads could use the processor.

DCE (and other systems) include features that permit the programmer to create and manipulate multiple threads in a single program. In DCE, this multi-threading feature is in the form of an application programming interface based on the "pthreads" interface, specified by POSIX in their 1003.4a Standard (Draft 4): IEEE P1003.4a/D4 Draft Standard, *Threads Extension for Portable Operating Systems,* Technical Committee on Operating Systems of the Institute of Electrical and Electronic Engineers (IEEE) Computer Society, New York, U.S.A., Aug. 10, 1990.

However, DCE and other multithreading systems require the programmer to structure a program with multiple threads of control, and this can introduce increasing complexity in designing the program. The numerous threads must be managed, scheduled and allowed to communicate in a controlled manner, and it is usually difficult to foresee all occasions in which concurrency would be appropriate, particularly if lengthy thread extensions are caused by factors at remote processors during remote calls.

Thus, multi-threading features tend to be inhibiting to use and problems are difficult to predict.

In addition, there is a cost associated with switching threads in the processor of the waiting thread, in saving and reloading the processor registers, and in making the appropriate stack adjustments for the new thread. Consequently, the number of planned control switches between threads in a processor should be minimized in a traditional multi-threading system in order to truly maximize the economic benefit of concurrency.

The solution proposed in non-object oriented systems and in some object oriented systems with extended compilers, for example COOL (R. Chandra, A. Gupta and J. Hennessy, "COOL: A Language for Parallel Programming", *Languages and Compilers for Parallel Computing,* Editors D. Gelernter, A. Nicolau and D. Padua, MIT Press, 1990), is a mechanism known as a "future result". When a remote call is issued, the result of the subroutine call is stored in a future object or type to be returned to the main program in response to a future procedure call. In this way, the main program continues to run on its processor while the subroutine runs concurrently or synchronously. If the main program comes to the "future" call before the future variable is available, the program simply blocks at that point to await the desired result.

In non-object oriented systems, the message that the user is implementing a synchronous invocation varies widely from language to language. Explicit functions, such as calling "resolve" with "future" as an argument might be required in some systems, while in other systems the "future" call is handled automatically.

Object oriented environments seem particularly well suited to use through remote calls and remote procedure calls because the conception and implementation of object oriented languages provides the tools and facilities for modular programming in code sharing.

The computer simulated "objects" in object oriented paradigms are defined and maintained independently of each other, the definition of an object including its "methods", (that is the procedures or operations the object is capable of performing), and its variables (that is, its attributes, the values of which can change over time). Objects are defined through class definitions. A class is a template that defines the methods and variables to be included in a particular type of object. Classes can be defined in terms of other classes, that is the characteristics (methods and/or variables) of a subclass can be inherited from a superior, more generalized base class. In addition to the methods and variables they inherit, subclasses define their own methods and variables and this may include characteristics permitting the override of inherited characteristics, although the implementation of such derived classes is visible only within the class to prevent contamination of other class implementations.

An abstract class is a base class with no objects or instances, the sole purpose of which is to organize a class hierarchy or to find methods or variables that will apply to a lower level inherited class. Yet inherited methods and variables can be more narrowly defined or even redefined in a derived class, so that objects defined through this technology can be highly specialized and can fit within a complex system of related but not identical objects, and class hierarchies can encompass many levels. The flexibility available through object oriented technology is certainly attractive in the promise of breadth it can add in distributed computing environments.

However, the most popular object oriented language, C++ for example, is an inherently sequential language without any provision for concurrency. In fact, concurrent programming operations have been difficult to implement in object oriented paradigms in general, due to a lack of proper support for concurrency control, synchronization and mutual exclusions.

Futures have been used in object oriented languages others than C++ (such as LISP, Concurrent SmallTalk and COOL), however previous attempts to introduce them into C++ have been syntactically clumsy, for example requiring a programmer to add prologue and epilogue code in the program to specifically deal with the futures, or have required an extension of the language or non-standard compiler modification.

Numerous attempts have also been made in adding concurrency to C++, employing one of two approaches. In the first approach, the language is extended and new language constructs are added to handle the creation and control of concurrency, that is, the compiler is extended to recognize the new language constructs. A common way used by these languages to add concurrency is to encapsulate concurrency creation, synchronization and mutual exclusion at the object level. Such an object is called "active". While such newer extended languages provide enhanced performance, higher level constructs, and compile time checking, they are limited by a lack of portability between operating systems.

The second approach employs a library of reusable abstractions that encapsulate the lower level details of concurrency (for example, architecture, data partitions, communication and synchronization). The library approach keeps the concurrency mechanisms outside of the language, allowing the programmer to work with familiar compilers and tools, and this supports a higher level of portability, while providing the option of supporting many concurrent models through a variety of libraries. However, while most present concurrent task libraries for C++ attempt to provide concurrency through "active" objects, they fail to provide implicit concurrency and they also impose unwieldy restrictions on users. For example, the task library described in T. W. Doeppner, Jr. et al: "C++ on a Parallel Machine", Report CS-87-26, Department of Computer Science, Brown University, November 1987, is one of the earliest C++ libraries providing true concurrency. However, thread management is explicit (proper management is imposed on the programmer) and only one level of subclassing is permitted (limiting the flexibility obtainable through multiple inheritance levels available in object oriented languages). Limiting the number of inheritance levels to one is similar to the approach taken in the class library described in AT&T's C++ Language System Release 2.0, Product Reference Manual, 1989, Select Code 307-146. The library described in D. Grunwald's "A Users Guide to AWESIME: An Object Oriented Parallel Programming and Simulation Systems", Technical Report CU-CS-552-91, Department of Computer Science, University of Colorado at Boulder, permits arbitrary levels of subclassing from the task class in the library called "thread", but thread management using this class library is again explicit. In the numerous attempts at solving the problem of concurrency in C++ through a class library, the issues of object distribution over a network, asynchronous invocation and future communication, are not addressed.

SUMMARY OF THE INVENTION

It is therefore an object of the present invention to provide a mechanism for introducing both asynchronous invocation and futures smoothly and implicitly into a compiled object oriented language such as C++ without compiler modifications or special pre-processing.

It is also an object of the present invention to provide a mechanism for issuing a thread for every active object that can run simultaneously with other active objects on a shared or distributed memory multi-processor, as well as on a homogeneous cluster of processors or in a single processor simulating concurrency.

The invention therefore provides an interface mechanism and related methods implemented through a computer operating system in a parallel computing environment having a non-extended object oriented compiler and at least two memory storage facilities associated with separate processing operations, each memory storage facility being adapted for constructing object classes. The interface mechanism is adapted for generating asynchronous processing operations through first link means for receiving a procedure call from a first processing operation in association with one of the memory storage facilities and issuing a response to cause resumption of the first processing operation, and at least one register for invoking a data object function for a second processing operation in association with another of the memory storage facilities alongside the first processing operation.

In a further embodiment, an interface mechanism is provided in a computer operating system having at least first and second processing means, a non-extended object oriented compiler and dynamic memory storage for constructing object classes associated with the first processing means, for generating parallel processing operations within a single object oriented program. The interface mechanism consists of first link means for receiving a procedure call from the first processor processing means and issuing a response to cause the first processing means to continue processing, and at least one register for invoking a data object function for processing on the second processor means.

Preferably, the interface mechanism also includes means for receiving and storing a resulting variable for processing of the data object function on the second processing means, and second link means for transferring the resulting variable to the dynamic memory storage associated with the first processing means.

In a further embodiment of the invention, a class library is provided that is adapted for use with a non-extended object oriented compiler in a parallel computing environment having at least first and second processing means and dynamic memory storage associated with the first processing means. The class library includes an object class containing function execution data for invoking asynchronous methods, a first interface adapted to be linked between the first processing means and the object class on receiving a procedure call from the first processing means, a second interface adapted to be linked between the object class and the second processing means for invoking processing of an asynchronous method and for receiving a result from said processing, and a third interface adapted to link the first processor means with the result from said processing.

BRIEF DESCRIPTION OF THE DRAWINGS

Embodiments of the invention will now be described in detail in association with the accompanying drawings, in which.

DETAILED DESCRIPTION OF THE PREFERRED EMBODIMENTS

Embodiments of the present invention have been developed for use on parallel processing systems such as shared memory or distributed memory multi-processors. However, it is intended that the invention is equally applicable to heterogenous distributed systems, for example, under a DCE type environment, and also in a uni-processor simulating concurrency, as in a reactive or interactive system.

The preferred embodiments of the present invention described herein have been implemented through a class library for C++. Utilizing the language operators of "virtual" declarations and "overloading" (the mechanism in C++ for redefining built-in operators, for example in a derived class), the invention provides that an interface is inserted in a procedure call from a program running on one processor to an object whose methods can or must be invoked on another processor. The interface mechanism then isolates the object from the calling program in the first processing environment, and provides for processing of the calling program and simultaneous independent processing of the method of the invoked object in a different processing environment.

Further, the result of invocation of the object is returned from the second processing environment to a register directly accessible from the first processing environment, and thereby made available if required at some future point in the calling program. If never required in the first calling program, the result is eventually deleted from this register.

Figure 1:
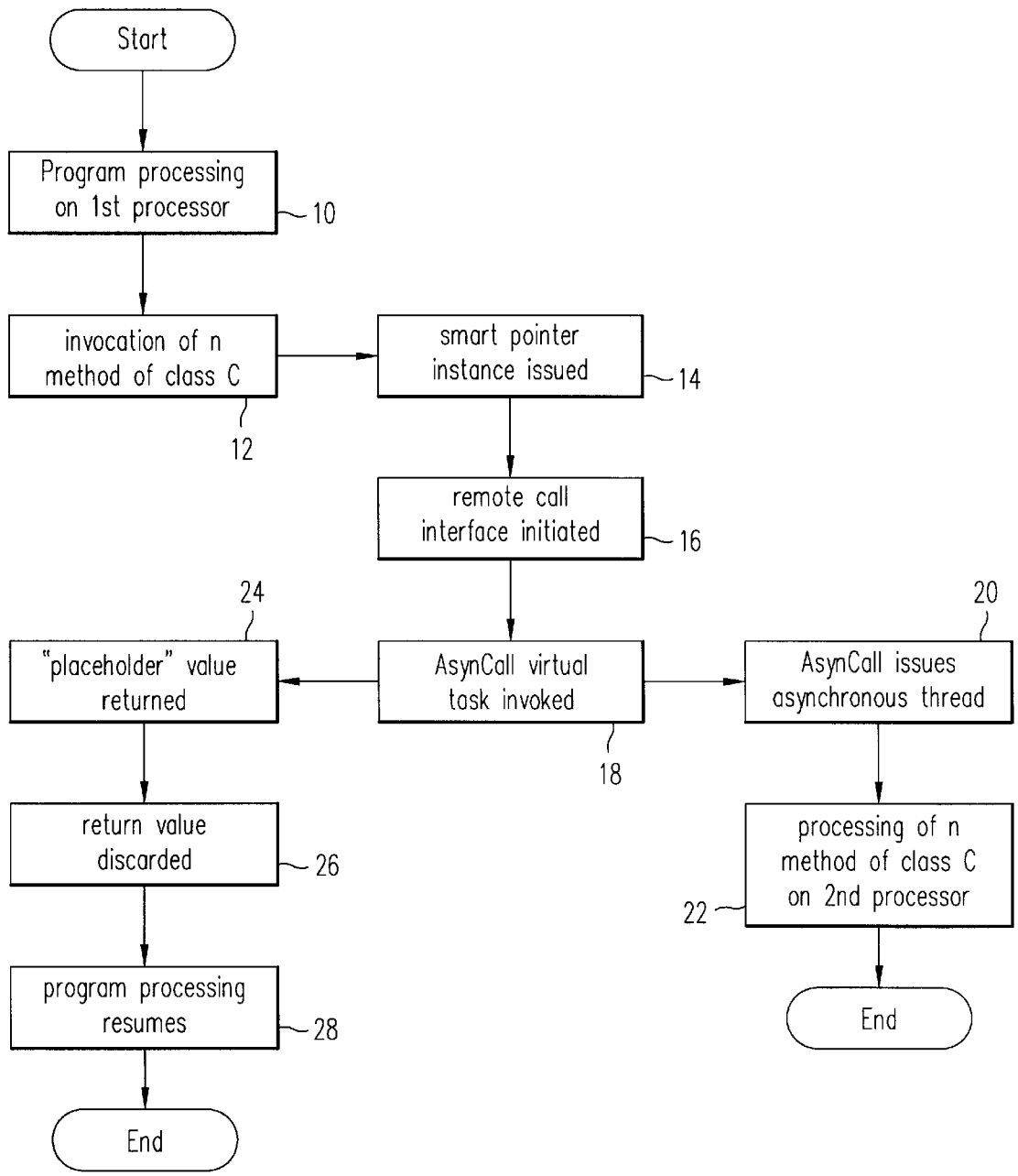
FIGS. 1 and 3 are flow diagrams illustrating the computer steps in initiating concurrent processing according to aspects of the invention.

The process for initiating concurrent or independent processing is illustrated in the flow diagram of FIG. 1. In the case of a multi-processor environment, a processor processing the calling program (block 10) invokes a method in a class whose data resides on a remote processor (block 12). This invocation results in the referencing or issuance of an "asynchronous" or "smart" pointer (block 14) which in turn initiates the remote call interface of the present invention (block 16) as described in detail below.

A template class in C++ is used to define a class of "smart pointers" which are used in the preferred embodiment to invoke or implement asynchronous invocation and are therefore referred to as asynchronous pointers. (Although the present invention is directed toward implementation of concurrent processing, each processing routine is permitted to continue normal processing operations in its own time. Therefore, each processing "thread" is treated as if it were an asynchronous operation.)

The concept of "smart pointers" was first introduced in C++ as a storage management scheme to permit the destruction from dynamic memory of data objects no longer in use.

Normally, a pointer is a variable used by a program to register the address or location in dynamic memory of a data field whose whereabouts varies. However, in traditional implementations, smart pointers point not to the location of an actual object, but to an intervening "virtual" object that contains a pointer to the actual object. The smart pointer can include other information pertinent to object destruction, including how many other pointers point to the actual object, as a safeguard against premature object destruction. Where the number of other pointers pointing to the actual object is zero, the actual object can safely be destroyed.

Figure 2:
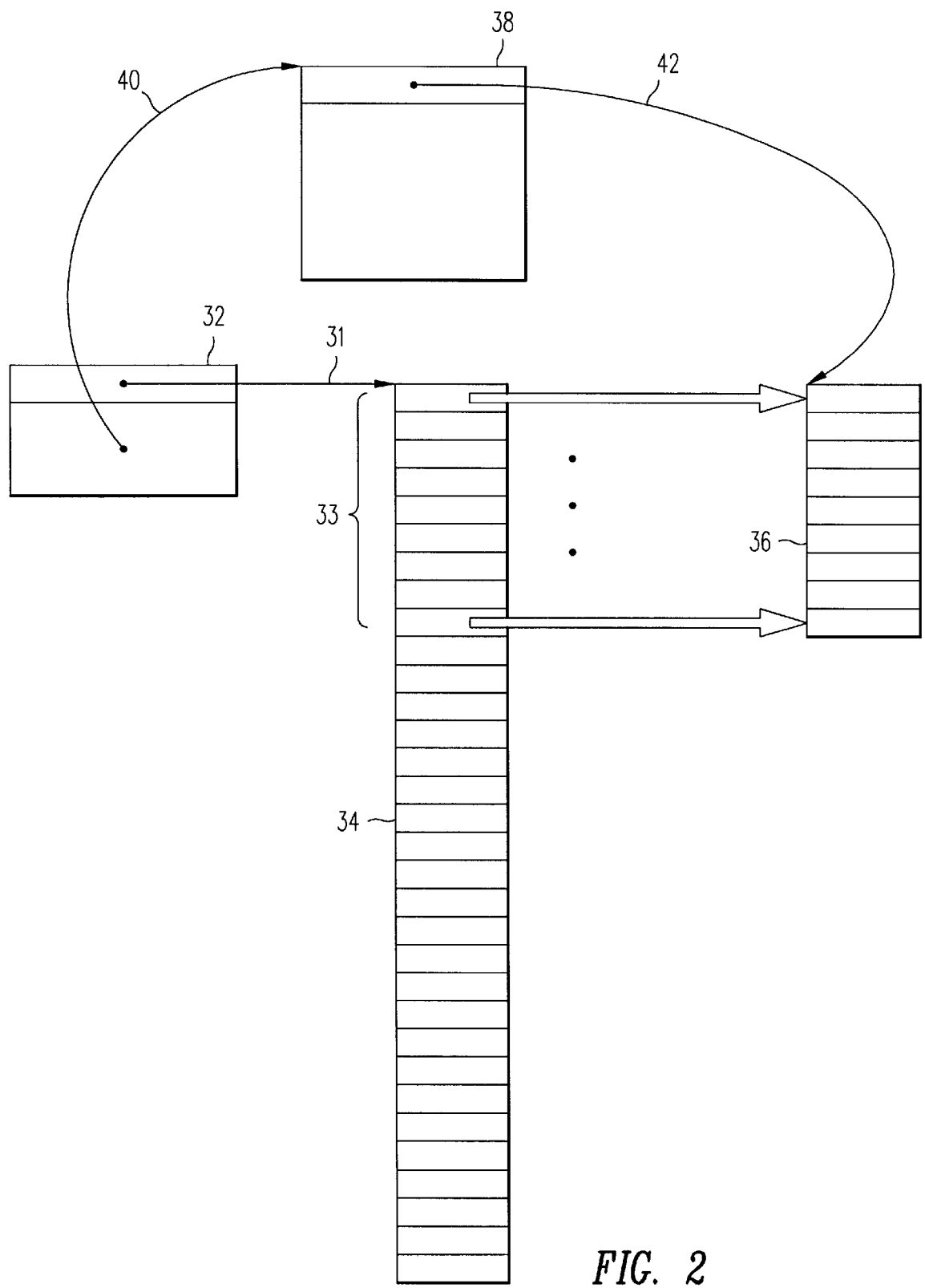
FIG. 2 is a schematic representation of the structure and functional operations of a pointer mechanism in the invention for asynchronous invocation.

In the preferred embodiment of the present invention, the template mechanism of C++ is used to define a class of smart pointers including a virtual functional table as illustrated at 34 in FIG. 2. As implemented in the preferred embodiment, the template class, called "AsynCall", contains a number of virtual "AsyncTask" pointers, any one of which could manage the creation and destruction of numerous independent or asynchronous threads having the built-in safeguards to avoid premature thread destruction discussed in further detail below. Thus, part of the private and public declarations of this AsynCall template class is defined as:

```
template<class T> class AsynCall [
    private:
        T* actual_pointer;
        virtual AsyncTask* af0( . . . );
        virtual AsyncTask* af1( . . . );
        virtual AsyncTask* af2( . . . );
              .
              .
              .
        virtual AsyncTask* afn( . . . );
    public:
        AsynCall(T* p){ actual_pointer = p; };
        AsynCall( ){ actual_pointer = (T*)0; };
        T* operator->( ){ return (T*)this; };
        AsynCall<T>& operator=(T* p){ actual_pointer = p; return(*this); };
        AsynCall<T>& operator=(const AsynCall<T>& arg){
            actual_pointer = arg.actual_pointer;
            return(*this);
        };
};
```

According to the invention, a procedure call or method invocation for an asynchronous invocation is issued from a smart pointer 32 to a "virtual" object, as in the traditional usage of smart pointers. However, the smart pointer does not return a pointer 40 to the target object of the call, but to an object which is typically itself, containing a virtual function table pointer 31 pointing to a virtual function table 34, where that object invokes the intended method from the target object virtual function table 36 by issuing a task which references the virtual function table pointer 42.

In a single level of inheritance, the object addressed by the pointer from the virtual object can be the smart pointer itself, and as shown in the AsynCall template listed above, up to 32 asynchronous tasks can be defined within the class and still fall within the recognized parameters of a virtual function table usable by the standard, non-extended compiler in C++. In the illustrated FIG. 2, the bracketed block 33 of virtual function table 34 represents the only virtual functions required for correspondence with the virtual function table 36 associated with the target object 38.

In the case of multiple inheritances, the pointer would be returned to an object with an appropriate nest of pointers, as known in the art.

In one aspect of the preferred embodiment of the invention illustrated in FIG. 1, the AsynCall virtual method takes care of handling the call on the target object (block 18), issues an asynchronous thread to commence processing on the called/invoked method (block 20), and returns the address of a "placeholder" to the calling object (block 24). The returned value is discarded by the caller (block 26), and the caller and called objects proceed concurrently (blocks 28 and 22).

The reason that this procedure produces an "asynchronous" invocation is because the methods of the smart pointer return to the caller immediately (blocks 18 and 24), leaving the spun off thread to proceed at its own pace. On a parallel computer, generating such threads produces true parallelism. Alternatively, in some parallel computing systems, parallelism is not produced by generating threads. Instead, an entry is made in a queue of pending tasks. In implementing the present invention in such a system, each of the methods of the smart pointer would make the appropriate queue entry and would then return immediately, allowing the calling task to continue processing while the asynchronous call waits for a worker task to execute it.

An example of an asynchronous invocation follows:

```
class C {
    public:
        int n;
        virtual int f( );
};
intC::f( ){ . . . ; return(n);}; //f computes for a while, then returns n
main( ){
    C c; // an instance of C
    AsynCall<C> p = &c; // a smart pointer instance
    p->f( ); //asynchronous invocation of f (result discarded)
    .
    . //some additional cornputation, in parallel with p->f( )
    .
}
```

Although asynchronous invocation is most useful on true parallel computers, it should be noted that it can still be usefully implemented on serial computers. On a serial computer, such threads and/or tasks can be simulated, allowing the programmer to express logical parallelism (although not true parallelism) where it makes sense to do so. It can be especially useful to do so in interactive or reactive systems where the capability of expressing and simulating parallelism can improve the throughput and perceived responsiveness of the system.

Figure 3:
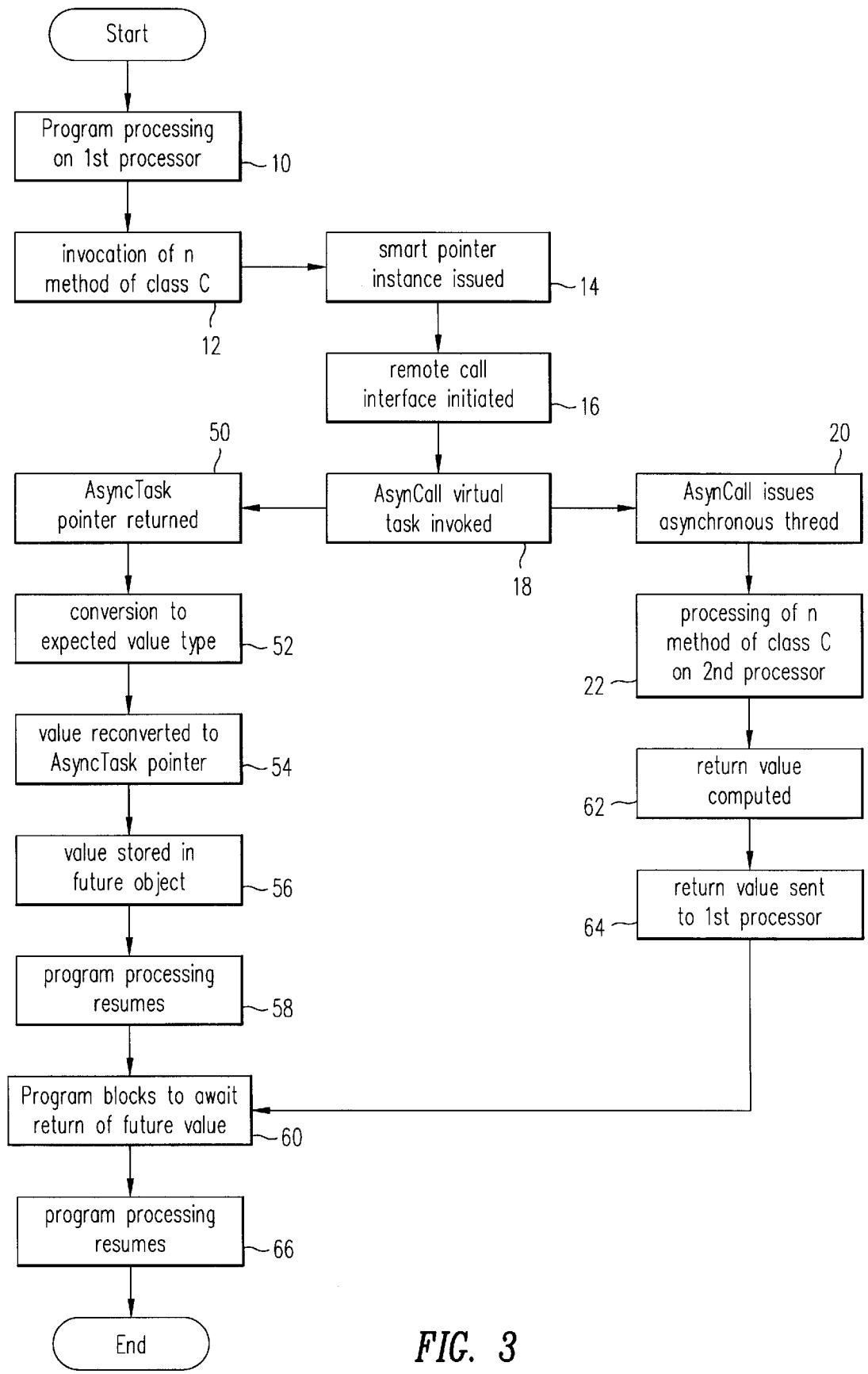

The present invention also permits the calculation of future values concurrently with processing of the main program and this is illustrated in the flow diagram of FIG. 3.

As mentioned above, futures have been introduced into C++, but only through the use of a pre-processor which renames all user methods so that method invocation can be intercepted. According to this mechanism, futures cannot be used to receive results from ordinary methods. Instead, the programmer must re-write all methods (usually in a derived class) in order to expect future reference arguments or return future results. This implementation of futures is very inconvenient and awkward to use.

In the present invention, futures have been introduced without the need for a pre-processor or extended compiler. The steps described above in relation to FIG. 1 are followed up until the point at which a value is returned to the calling program to permit resumption of processing (block 24 in FIG. 1). Instead of returning a "placeholder" value to be discarded, the asynchronous pointer returns a value to the calling program (block 50 in FIG. 3), although it is not the hoped for value to be returned from the target method operating on the target object. Instead, it is a pointer to the thread (or worker task queue entry) that is charged with computing that result.

In the preferred embodiment of the invention, the return type would be labelled AsyncTask (that is, a pointer to an asynchronous task) but the specific return type would depend on the particular parallel computing system that the futures are implemented within. These AsyncTask pointers are a key element in the system for implementing futures in this form of the embodiment, because each time one is returned to a calling program, it essentially serves as a temporary stand-in for the value that will eventually be returned from a target method. If the calling program does not need a value returned from some target method, it can discard the AsyncTask pointer returned to it (as proposed in the FIG. 1 method). However, if the calling program anticipates requiring this value, the value is stored into a future object (blocks 52 to 56), created with a future template such as described below:

```
template<class T> class Future {
    AsyncTask* at;
public:
    Future(const T& val){
        at=(AsyncTask*)val; //The value actually used is a tast pointer
    };
    Future( ){ at = (AsyncTask*)0; };
    Future<T>& operator=(const T& val){
        at=(AsyncTask*)val;
        //The value actually assigned is a task pointer
        return *this;
    };
    int readyp( ){ return at ->readyp( ); };
    conversion operator T( ) { return (%) at ->join( ); };
        //join waits for the thread to complete,
        and returns the compute value
};
```

The future class is parameterized on the type of the value expected to be returned from the target method, which shows a future being used.

Then, any processing program uses the value returned from an asynchronously invoked target method, it uses the overloaded "=" operator to store into a future object the value that is immediately returned from the asynchronous method invocation. The compiler allows the future object to be used as a target of such an assignment because the overloaded "=" operator is typed to expect an argument of the same type as the invoked method is typed to return. In actuality, however, the value returned is of type AsyncTask, and essentially the compiler is misled regarding the type of the pointer returned from the asynchronous invocation. This causes the compiler to generate code to invoke one of AsynCall's virtual methods instead of the target method. When AsynCall's invoked method returns an AsynTask instead of a Task (block 64), and the future objects "="

operator misleads the compiler by telling it that its expected argument has type Task, when the type of the argument is known to be really an AsynCall task. In this way, virtually any C++ compiler, unmodified and unextended, will generate code which implements futures which have the look and feel of a smoothly integrated language extension.

In the preferred embodiment, futures are specifically invoked in the following way.

The first action taken by operator "=" when it is invoked is to convert its argument to be of the correct type (that is, AsynTask block 52). In the template class, this conversion is done with a simple type cast, however in practice, more complex conversions can be employed, such as extracting the first word of a multi-word returned value. Such a conversion can even be keyed on the size of the returned value by applying the C++ size of operator to task in the future template.

Secondly, the operator "=" assigns its converted argument to a private variable (block 54) so that a record is made of which a computing agent is responsible for generating the hoped for actual value eventually to be returned from the target method. Finally, operator "=" returns to the calling program giving a reference to itself as its return value (block 56).

Once the operator "=" has returned from its invocation on a future object, the calling program can proceed independently without having to wait for the result which is eventually to be computed by the target method (block 58). However, that result will usually be needed at some point, and the future object represents a "promise" to deliver it. The promise is fulfilled (that is, the future is "resolved") by the conversion operator (operator "T") as shown in the futures template. This operator is invoked by C++ whenever a future instance is used where a task is required. The conversion operator performs more than a simple conversion; it checks to see if the future has been resolved (that is, the asynchronous invocation has returned the expected result). If the future object is unresolved, the conversion operator waits for completion of the asynchronous invocation causing the calling program to block, if necessary (block 60). Once the future object is resolved, the conversion operator returns the expected value (blocks 62, 64) and the calling object proceeds with its activity (block 66)

The use of future objects is demonstrated below:

```
class C {
  public:
    int n;
    virtual int f( );
};
int C::f( ){ . . . ; return(n);};
//f computes for a while, then returns n
main( ) {
    int y;
    C c;
    AsynCall<C> p = &c;
    Future<int> x;
    x = p->f( ); //as before, an asynchronous call,
    this time returning a value
    .
    . //do some computation
    .
    y = x; //wait for and then retrieve the value returned from p->f( )
}
```

In a further aspect of the preferred embodiment, the issue of storage management as it relates to asynchronous tasks is addressed. C++ does not have any native garbage collection (dynamic data structure management) facilities and thus C++ programmers must handle dynamic storage explicitly with the operators "new" and "delete". In the preferred embodiment, the utilization of futures imposes no special storage management requirements on the users of futures, but AsynCall and future templates must themselves be programmed to handle storage sensibly. In other words, the AsynCall template that dynamically allocates the asynchronous task that is to perform the work of asynchronous method invocation must also include arrangements for that storage to be deleted later.

In one alternative, the AsynCall destructor would perform the deletion. The destructor would wait for the asynchronous task to terminate before deleting it, but this would mean that future instances would be deleted along with the AsynCall instances used to generate them.

Another alternative proposed in the invention is for the AsynCall pointer to delegate deletion to the future instance to which its result is assigned. Thus, futures performing such deletions would include their destructors. However, care would have to be taken to avoid the possibility of assignment to a future instance (i.e. the result is discarded).

In the preferred embodiment illustrated in FIG. 2, the AsynCall methods return a pointer 40 to an object which in turn contains the asynchronous task pointer 42. This object could also contain an integer to be used by the future instance to indicate that it has taken over the chore of deletion. Then, when the AsynCall destructor is invoked, it would first check to see if a future has committed itself to do deletion, and if not, to do the deletion itself.

If deletion is delegated to futures, then the futures template would be modified to include a copy constructor (and possibly additional private data) in order to manage multiple copies of futures. Copying of a future could occur either by assignment or by parameter passing, and would ordinarily not be a problem in C++.

However, if copying occurs in concert with delegation of deletion, then standard C++ techniques (such as reference counting) would be employed to ensure that the only copy of a future to do a deletion is the one which was last destroyed.

In the case of multiple invocations (i.e. concurrently running several asynchronous method invocations) on a single object, a complication arises in storage management because many or all of those invocations may have been generated by a single AsynCall pointer. If it is to be the pointer's responsibility to perform otherwise uncommitted deletions of the task that it generates, then it has to maintain a list (or other container) of such tasks so that its destructor can iterate over the list to do the deletions.

The concurrent class library of the preferred embodiment of this invention is presently implemented on a network of "IBM® RISC SYSTEM/6000®" processors (IBM and RISC SYSTEM/6000 are registered trademarks of International Business Machines Corporation.) processors using TCP/IP for inter-processor communication. It is written in C++, with the exception of a few lines of code which are written in assembly language. However, it will be obvious to one skilled in the art that the concurrent class library may be ported to other platforms, including distributed memory multi-processors and uni-processors with features simulating parallel processing capabilities.

While the invention has been particularly shown and described with reference to preferred embodiments thereof, it will be understood by those skilled in the art that various changes in form and details may be made therein without departing from the spirit and scope of the invention.

What is claimed is:

1. In a computing environment having a non-extended object oriented compiler and at least two memory storage facilities associated with separate processing operations, each memory storage facility being adapted for constructing object classes, an interface mechanism for generating asynchronous processing operations, comprising:

first link means for receiving a procedure call from a first processing operation in association with one of the memory storage facilities and for issuing a response to cause resumption of the first processing operation, wherein the first link means comprises a pointer mechanism adapted to return a placeholder value to the first processing operation, and further comprising means in the first processing operation to discard the placeholder value;

at least one register for invoking a data object function for a second processing operation in association with another of the memory storage facilities alongside the first processing operation;

means for receiving and storing a resulting variable from the second processing operation; and second link means for transferring the resulting variable to the one memory storage facility associated with the first processing operation, wherein the second link means comprises:

a convertor for converting the response from the first link means to a future value variable in the first processing operation; and means for replacing the future value variable with the resulting variable in the first processing operation.

2. In a parallel computing environment having at least first and second processing means, a non-extended object oriented compiler and dynamic memory storage for constructing object classes associated with the first processing means, an interface mechanism for generating parallel processing operations within a single object oriented program, comprising:

first link means for receiving a procedure call from the first processing means and issuing a response to cause the first processing means to continue processing, wherein the first link means comprises a pointer mechanism adapted to return a placeholder value to the first processing means, and further comprising means in the dynamic memory storage invokable to discard the placeholder value;

at least one register for invoking a data object function for processing on the second processing means;

means for receiving and storing a resulting variable from processing of the data object function on the second processing means; and second link means for transferring the resulting variable to the dynamic memory storage associated with the first processing means, wherein the second link means comprises:

a convertor for converting the response from the first link means to a future value variable in the first processing means; and means for replacing the future value variable with the resulting variable in the first processing means.

3. A process for implementing asynchronous processing operations in a computing environment having at least a first object oriented processing means and at least two memory storage facilities associated with separate processing operations, comprising the computer implemented steps of:

receiving a procedure call from a first processing operation in association with one of the memory storage facilities and issuing a response to cause resumption of the first processing operation, by use of a first link means, wherein the first link means comprises a pointer mechanism adapted to return a placeholder value to the first processing operation, and further comprising means in the first processing operation to discard the placeholder value;

invoking a data object function for a second processing operation in association with another of the memory storage facilities alongside the first processing operation by use of a register;

receiving and storing a resulting variable from the second processing operation; and transferring the resulting variable to the one memory storage facility associated with the first processing operation by use of a second link means wherein the second link means comprises:

a converter for converting the response from the first link means to a future value variable in the first processing operation; and means for replacing the future value variable with the resulting variable in the first processing operation.

4. An article of manufacture for use in a computer system, for implementing asynchronous processing operations in a computing environment having at least a first object oriented processing means and at least two memory storage facilities associated with separate processing operations, said article of manufacture comprising a computer-readable storage medium having a computer program embodied in said medium which may cause the computer system to:

receive a procedure call from a first processing operation in association with one of the memory storage facilities and issue a response to cause resumption of the first processing operation, by use of a first link means, wherein the first link means comprises a pointer mechanism adapted to return a placeholder value to the first processing operation, and further comprising means in the first processing operation to discard the placeholder value;

invoke a data object function for a second processing operation in association with another of the memory storage facilities alongside the first processing operation by use of a register;

receive and store a resulting variable from the second processing operation; and transfer the resulting variable to the one memory storage facility associated with the first processing operation by use of a second link means, wherein the second link means comprises:

a convertor for converting the response from the first link means to a future value variable in the first processing operation; and means for replacing the future value variable with the resulting variable in the first processing operation.

* * * * *